United States Patent [19]

Lebensfeld

[11] Patent Number: 4,498,164
[45] Date of Patent: Feb. 5, 1985

[54] RECORD PLAYERS

[76] Inventor: Steven A. Lebensfeld, 2 Fifth Ave., New York, N.Y. 10011

[21] Appl. No.: 512,196

[22] Filed: Jul. 8, 1983

[51] Int. Cl.³ .............................................. G11B 3/40
[52] U.S. Cl. ..................................... 369/177; 369/63
[58] Field of Search ........................... 369/63, 67, 177

[56] References Cited

U.S. PATENT DOCUMENTS

| | | | |
|---|---|---|---|
| 1,484,965 | 2/1924 | Ritter | 369/63 |
| 3,362,716 | 1/1968 | Dunn | 369/177 |
| 3,482,841 | 12/1969 | Doring | 369/177 |
| 4,166,624 | 9/1979 | Mori et al. | 369/177 |
| 4,232,202 | 11/1980 | Mori et al. | 369/63 |

Primary Examiner—Steven L. Stephan
Attorney, Agent, or Firm—Hubbell, Cohen, Stiefel & Gross

[57] ABSTRACT

A children's record player which can be in the shape of a toy vehicle designed to be placed on top of a gramophone record and drive around and over that record. The record player has a base with a central downward pin engaging the center of the record and a pair of wheels, one of which is driven to cause the device to sweep around the record. A playing arm is provided having at its trailing outer end a pick-up engaging the sound groove in the record. The whole thing is mounted on a base and the pick-up extends through an opening in the base when in a playing position but is raised forwardly so as to be totally within the base and so protected from damage when the record player is controlled by a pivoted lever whose pivoting in turn automatically lifts the pick-up wholly within the base during non-operation.

7 Claims, 7 Drawing Figures

RECORD PLAYERS

This invention relates to record players and in particular a record player which is particularly appealing for use by children.

BACKGROUND OF THE INVENTION

Conventional record players have a rotatable turntable on which the record is turned at a constant rate of rotation. A stationary playing arm carries a playing head having a needle which follows the sound reproduction groove in the record and mechanical vibrations imparted by the shape of the groove, are transformed to an electrical signal which is amplified and reproduced through a loudspeaker. Such apparatus is usually quite delicate and therefore unsuitable for use by children.

There have also been proposals to provide some form of record player where the head travels in a helical path around the record following the reproduction track. In particular, there have been proposals for a free standing independently driven device to follow this path, whilst moving the pickup head around the sound reproduction groove. Such previous devices have been extremely complex and wholly unsuitable for children's use.

It is therefore an object of the present invention to provide a device which can be robust and capable of a degree of rough handling from children with reduced risk of damage.

SUMMARY OF THE INVENTION

According to the invention, there is provided a record player arranged to be placed on top of a stationary record to sweep around the record about a pivot point at the center of the record and to reproduce sound from the sound groove in the record, comprising:

a support base;

a downwardly projecting pin arranged to engage in and locate with the center of a sound record;

pivot means between said base and said pin; a pair of spaced wheels rotatably carried by the base, said wheels having axes about which said wheels are rotatable, said axes being aligned radially relative said pin, and said wheels engaging the upper surface of said record near its outer periphery to support said base above said record;

an electric drive motor for driving one of said wheels at a substantially constant speed whereby said base sweeps around the record about the pivot pin at a present rate of rotation; a playing arm pivotally carried by said base and having an outer trailing end;

a pickup head and needle at said outer trailing end for engaging in the sound reproduction groove of the record as said base sweeps around said record;

lifting means positioned beneath said arm for engaging and raising it so that said head and needle are above the level of said base when said device is not operating;

a control lever pivoted to said base and movable between an operating position and a non-operating position;

switch means controlled by said lever for controlling energisation of said motor when said lever is in said operating position;

battery means carried by said base for powering said motor through said switch means;

a first projection formed on said lever and arranged to engage said lift-up means when said lever is in its non-operating position to raise said head clear of a record; and a sound reproduction means including a loudspeaker for providing a sound output from the signal provided by said pickup head.

Such a record player has the advantage that the needle is wholly within the base and so not exposed to possible damage when a child will be handling the record player both perhaps to look at it out of curiosity or initially to place it on a record. This pick-up head and its needle is perhaps the most delicate part of the record player and it is therefore important to give this protection in case of rough handling. However, once the record player is to operate, the playing arm can hang down freely with the pick-up head and the needle able to engage the playing surface of the record through an opening in the base.

DESCRIPTION OF THE DRAWINGS

The invention will now be described, by way of example with reference to the accompanying drawings, in which.

DESCRIPTION OF THE PREFERRED EMBODIMENT

Figure 1:
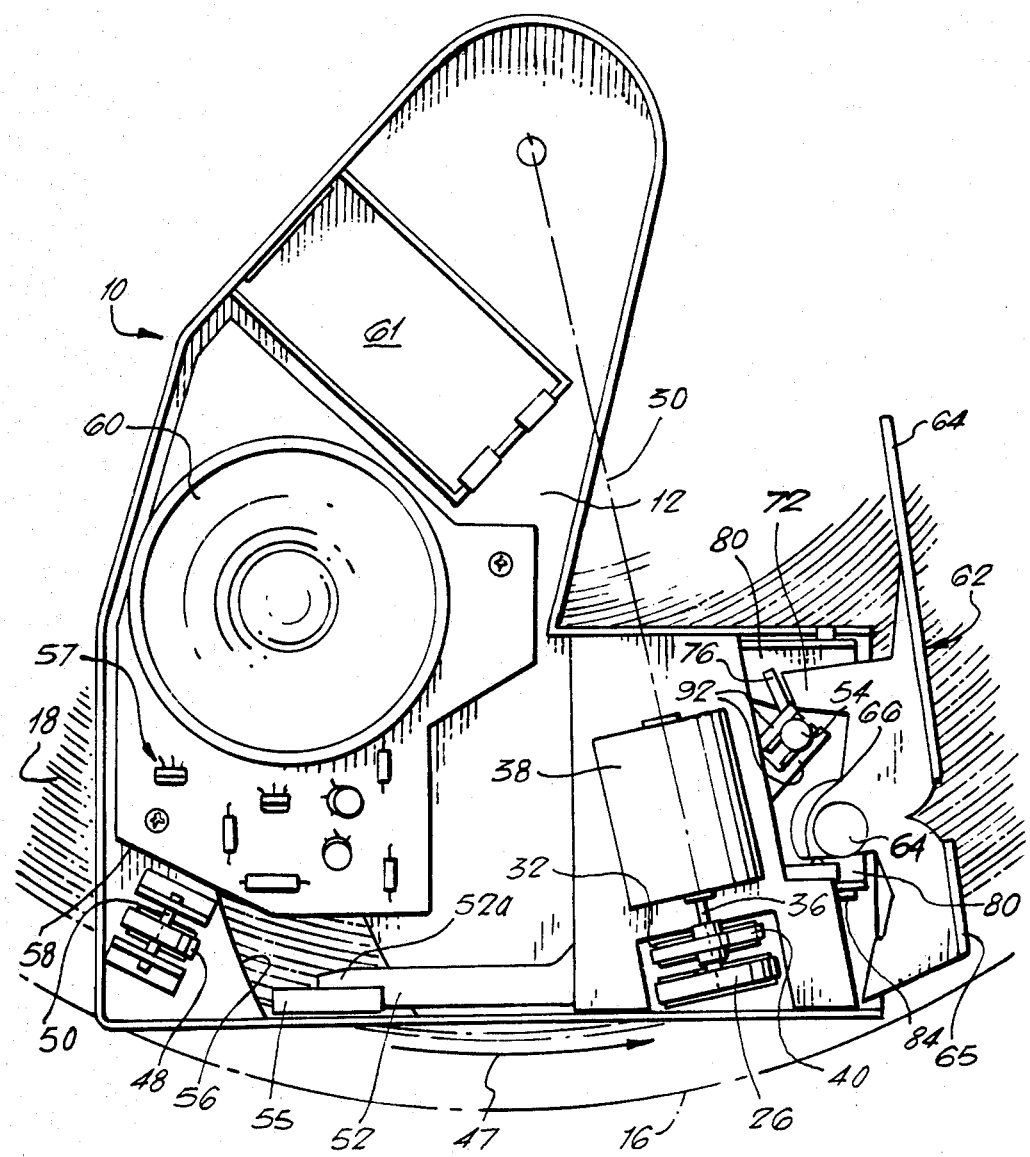
FIG. 1 is a plan view of a record player according to the invention with the top cover removed.

The toy record player 10 shown in the drawings comprises a base 12 on which is mounted a body 14 in the shape of a toy car together with associated roadside scenes such as a curb and a lamp post 15. The appearance of the record player is designed to stimulate a child's interest and the device is intended to be placed on top of a stationary gramophone record 16 shown in dotted lines in FIGS. 1 and 4. The device is intended to give the appearance of the car driving round and round the record whilst at the same time reproducing sound from the sound groove 18 in the record.

Figure 3:
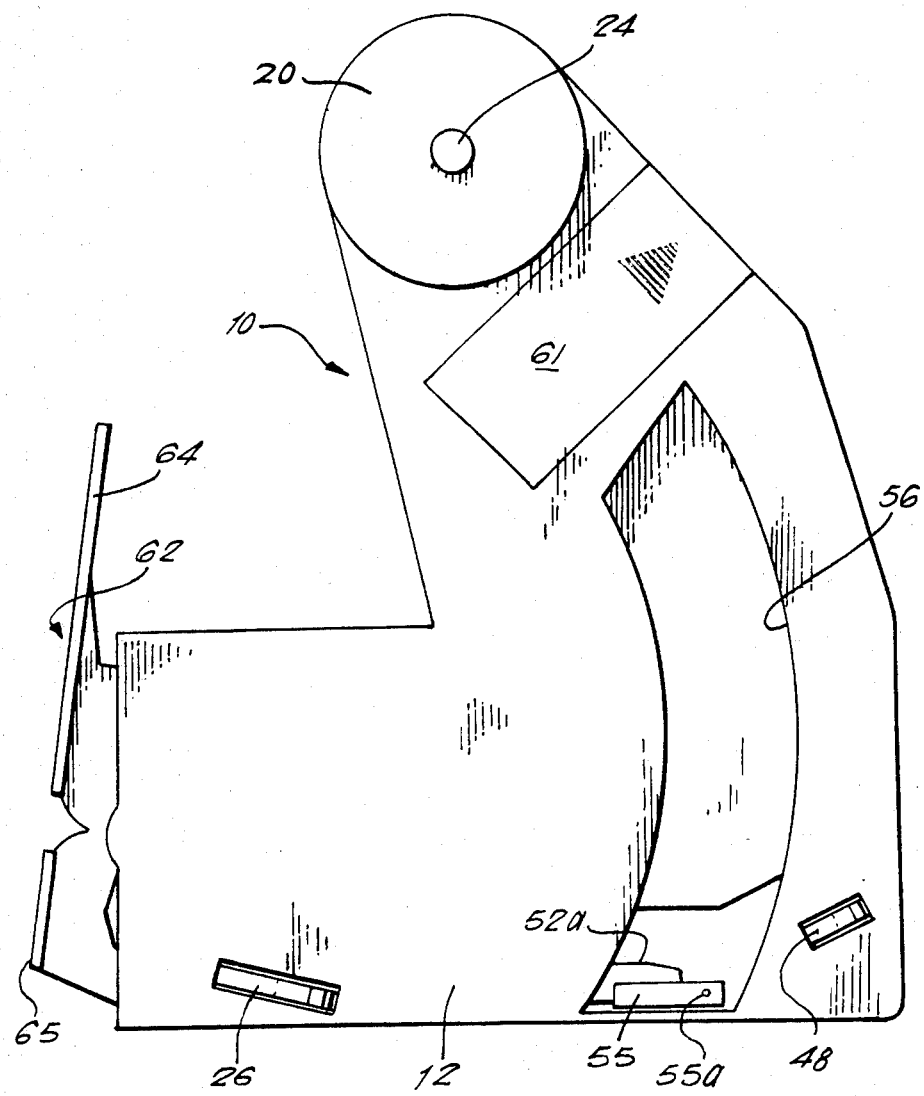
FIG. 3 is an underneath view.
Figure 4:
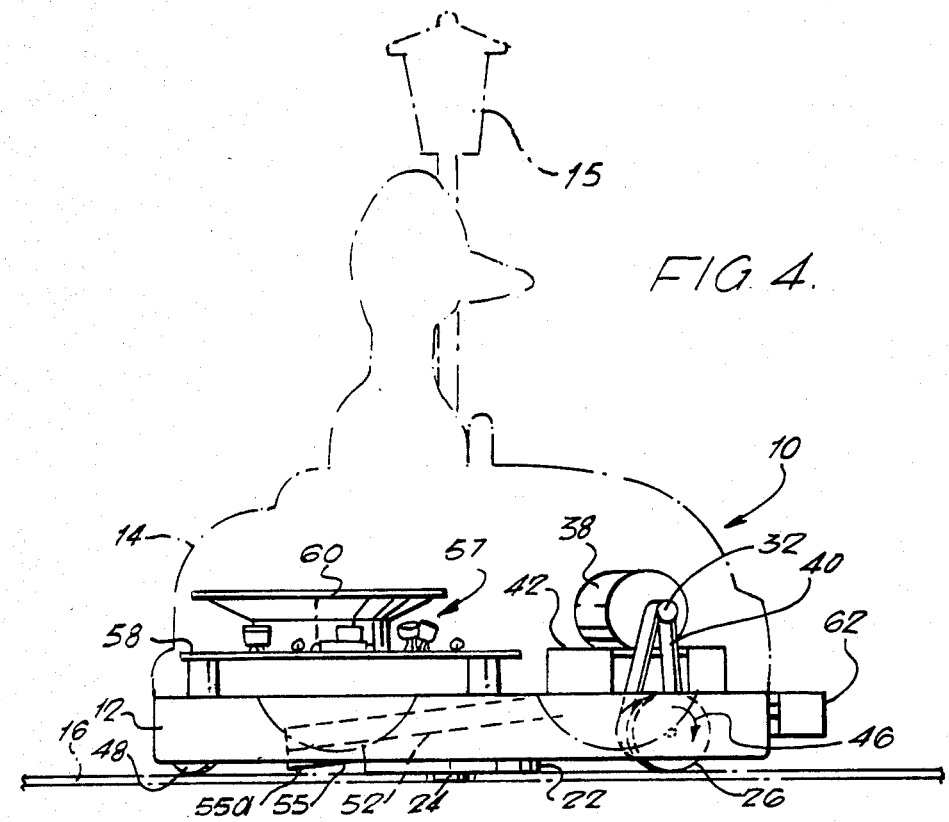
FIG. 4 is a side view from the radially outermost side of the record player.

As best shown in FIGS. 3 and 4, a disc 20 is rotatably journalled to the underside of the base 12 at a position corresponding to the center of the record. At the center of the disc in a small downwardly projecting spigot 24 which is intended to locate in the central hole of the record and so guide the device as it sweeps around the record.

Figure 2:
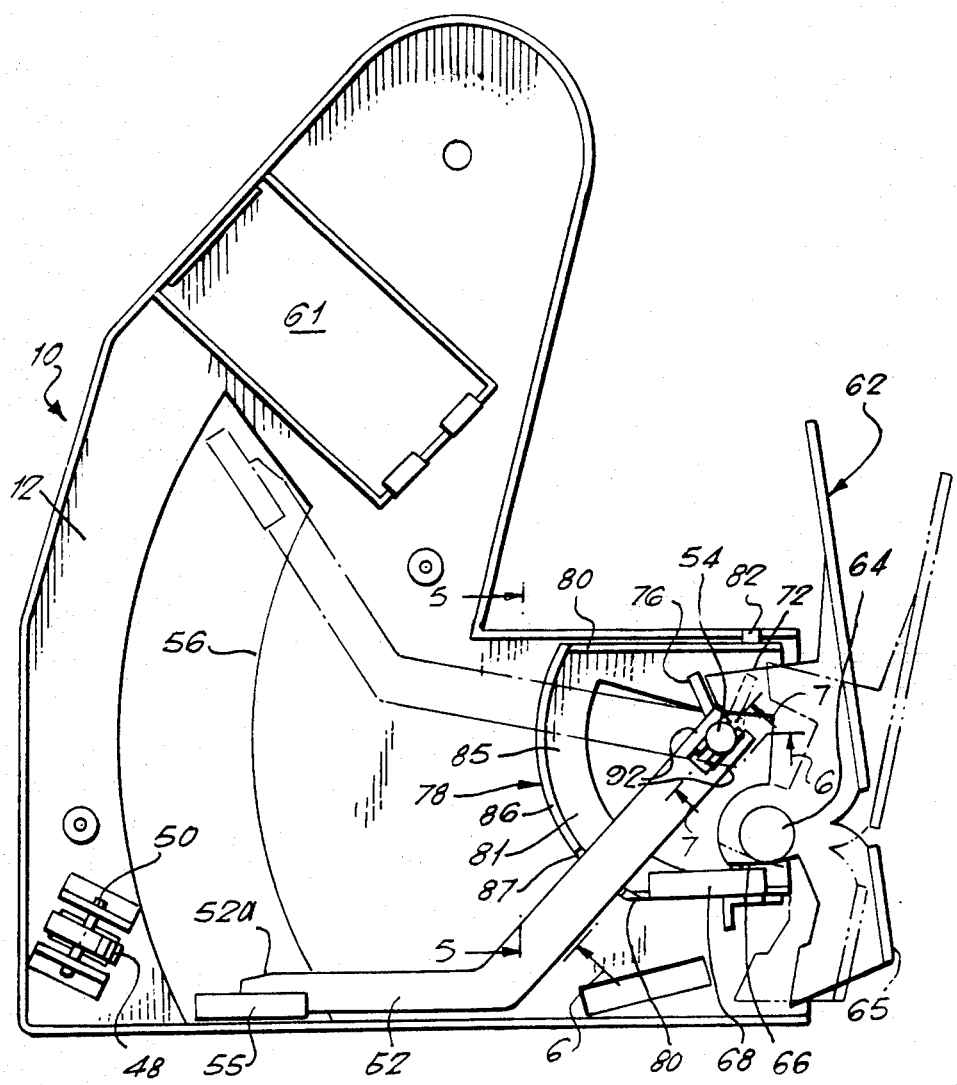
FIG. 2 is a plan view similar to FIG. 1 after removal of certain internal components.

Rotatably journalled on the base is a driving wheel 26; the axis on which it is rotatably mounted is as shown by the broken line 30 in FIG. 2 radially aligned with the axis of the spigot 24. The driving wheel 26 is mounted on a spindle in common with a small pulley 32. This is in turn joined to an output pulley 34 on the drive shaft 36 of an electric motor 38 by means of a flexible belt 40. The motor is carried on a small stand 42 above the level of the base 12. When the motor is energised, this will in turn drive the wheel 26 in the direction of the arrow 46 shown in FIG. 4 and cause the player 10 to orbit about the spigot 24 in the direction of the arrow 47 shown in FIG. 1.

A third point of support between the base 44 and the record is provided by a trailing wheel 48 rotatably journalled on a spindle 50 carried by the base. The wheels 26 and 48 support the base a short distance above the playing surface of the record as is best shown in FIG. 4.

A playing arm 52 is pivoted to the base about a support pin 54 upstanding from the base. Near its free end 52a, the arm 52 carries a conventional pickup head 55 having a playing needle 55a designed to engage in and follow the sound groove 18 of the record. To allow the needle to come into contact with this sound groove, a sector-shaped cutout 56 is provided through the base, the axis of the sector-shaped cutout coinciding with the pivotal axis of the arm i.e. of the pin 54. During playing, therefore, the base sweeps around the record and the playing arm trails from this, being guided by the engagement of the playing needle 35a in the groove 18 from the outside of the playing surface to the inside of the playing surface.

The electrical signal from the pickup head is generated in an entirely conventional fashion for record players and is passed through small wires, not shown, to an amplifying circuit 57 not shown in detail but mounted on the printed circuit board 58 and the electrical output is passed to a loudspeaker 60 to give a sound output. The sound amplification and reproduction are entirely conventional and no further discussion is believed necessary.

The base has defined in it a battery compartment 61 for electrical storage batteries, not shown, which are used to drive the motor 38 and amplifying circuit 57 in a conventional fashion.

The operation of the device is controlled by means of two-armed crank 62. This is pivotally mounted on the base about an upstanding spigot 64. One arm 64 of this crank extends radially inwardly whilst the other arm 65 extends radially outwardly of that pivot point relative to the spigot 64 about which the whole device rotates around the record. The crank has an off-position shown in full lines in FIG. 2 and an on-position shown in ghost lines in FIG. 2 where the device is operating. Thus, to start operation of the device, the arm 64 is depressed relative the base 12 (i.e. rotating the crank 62 in an anti-clockwise sense as seen from above in FIG. 2) and to stop the device at the end of the record or when required, the arm 65 is depressed relative the base.

Integrally formed with the crank 62 is a cam face 66. This is designed to engage a micro switch 68 interposed between the batteries and the motor 38 and electronic amplifying circuit 57. When the crank 62 is moved to its operating position shown in ghost lines in FIG. 2, the cam face 65 actuates the micro switch 68 to cause the device to work and when the crank is moved to its non-operating position as shown in full lines the cam face disengages the micro switch which then deactivates the motor and circuit.

Also integrally formed with the crank 62 is a wedge-shaped projection 70. Spaced above this is another projection 72. Extending radially out from the playing arm at a point near the pivot pin 54 is a flange 76. This is designed to be engaged by the projection 72 when the crank is in its non-operating full line position shown in FIG. 2.

The engagement between the flange 76 and projection 72 ensures that the playing arm is kept in its outermost position as shown in full lines in FIG. 2 so that it is ready to start playing at the outside of the playing groove of the record. All the while the crank 62 is in its operating position, the projection 72 is clear of the flange 76, even when the playing arm reaches the radially innermost part of the playing groove corresponding to the ghost line position shown in FIG. 2. However, in the event that the playing arm is in its outermost position, movement of the crank 62 to its non-operating position will sooner or later cause the projection 72 to engage the flange 76 and push the playing arm 52 to its radially outermost position.

A yoke 78 having two spaced arms 80 joined by a sector-shaped intermediate portion 81 is positioned beneath the playing arm 52. The axis of the sector-shaped intermediate portion 81 coincides with the pivot pin 54. The arms 80 of this yoke are pivotally joined to the base 12, one by means of a pin 82 extending from the inner side edge of the base and the other by means of a pin (not shown) extending from a lug 84 upstanding from the base.

The intermediate portion 81 has an upstanding wall 85 designed to engage the underside of the playing arm 52 when it is desired to raise this from the record. The arm 80 has a lower flange 86, the underneath of which is capable of being engaged by the wedge-shaped projection 70. This engagement with the wedge-shaped projection 70 will progressively cam the yoke 78 to an upper position where the wall 85 engages and raises the playing arm 52. Thus, in the operating position of the crank 62, there is no engagement between this flange 86 and the wedge-shaped projection 70 and so the yoke 78 assumes a downward position resting on the base with the wall clear of the playing arm. The arm is therefore free to travel over the playing groove of the record without interference. On the other hand, as the crank 62 is brought to its non-operating position, the wedge-shaped projection 70 enters under the flange 86 causing the yoke 78 to pivot to an upward position. As it does so, its wall 85 engages the playing arm 52 and raises it.

The length of the projection 72 is such that it will not begin to engage the flange 76 to return the arm 52 to its outer position until the needle 55a has been raised clear of the playing surface.

Figure 5:
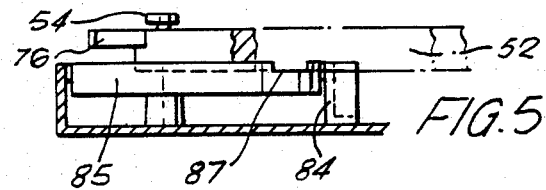
FIGS. 5, 6 and 7 are enlarged sectional details taken along the lines 5—5, 6—6 and 7—7, respectively, of FIG. 2.

As best shown in FIG. 5, the right-hand end of the wall 85 has a cutout portion 87 in which the underneath of the playing arm is located and held when the yoke 78 is in its raised position. This assists in retaining the arm in its outermost position when the device is not operating. Additionally, the height of the wall 85 including that of the cutout portion 86 are designed so that when the yoke 78 is in its raised position, the playing head 55 is lifted sufficiently that it is completely enclosed within the base 12 and does not project through the sector-shaped cut-out 56. This helps to protect the sensitive playing head 55 and needle 55a when the device is not working.

Figure 7:
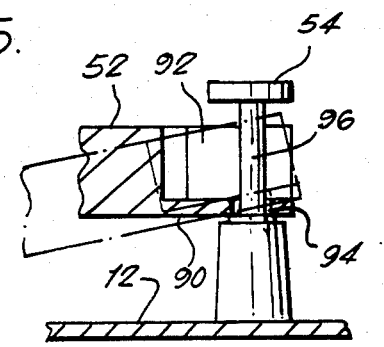
Figure 6:
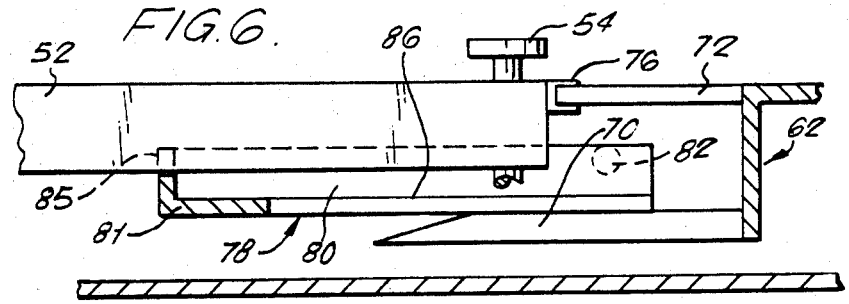

The pivoting of the arm 52 to the pivot pin 54 is shown in more detail in FIG. 7. As can be seen, the inner end 52b of the arm is hollowed to provide a lower web 90 and two spaced upstanding side walls 92. Through the web 90 is a small hole 94 through which the shank 96 of the pin 54 passes and the arm 52 therefore pivots. In addition, the inside directed faces of the wall 92 engage the shank 96 to guide the arm in an upright sense so that the head 55 and needle 55a do not rock from side to side but so that the arm and head 55 can be raised and lowered by the yoke 78.

The toy record player 10 is simple to operate and can be of robust construction so that children can use it. The withdrawal of the playing head 55 and needle 55a within the base 12 also ensures that these very delicate parts are protected from rough handling when the device is not operating.

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

I claim:

1. A record player arranged to be placed on top of a stationary record to sweep around the record about a pivot point at the center of the record and to reproduce sound from the sound groove in the record, comprising:
   a support base;
   a downwardly projecting pin arranged to engage in and locate with the center of a sound record;
   pivot means between said base and said pin; a pair of spaced wheels rotatably carried by the base, said wheels having axes about which said wheels are rotatable, said axes being aligned radially relative said pin, and said wheels engaging the upper surface of said record near its outer periphery to support said base above said record;
   an electric drive motor for driving one of said wheels at a substantially constant speed whereby said base sweeps around the record about the pivot pin at a preset rate of rotation;
   a playing arm pivotally carried by said base and having an outer trailing end;
   a pickup head and needle at said outer trailing end for engaging in the sound reproduction groove of the record as said base sweeps around said record;
   lifting means positioned beneath said arm for engaging and raising it so that said head and needle are above the level of said base when said device is not operating;
   a control lever pivoted to said base and movable between an operating position and a non-operating position;
   switch means controlled by said lever for controlling energisation of said motor when said lever is in said operating position; battery means carried by said base for powering said motor through said switch means;
   a first projection formed on said lever and arranged to engage said lift-up means when said lever is in its non-operating position to raise said head clear of a record; and
   a sound reproduction means including a loudspeaker for providing a sound output from the signal provided by said pickup head.

2. A record player according to claim 1 in which said lifting means comprise a sector-shaped yoke having a pair of arms each pivoted at one end to said base and joined at their other end by a sector-shaped intermediate portion, one of said arms being engaged with said first projection to cause said yoke to pivot to an upward position and engage said arm and raise it when said operating lever is in its non-operating position.

3. A record player according to claim 2 further comprising an upstanding wall on said intermediate portion of said yoke, said upstanding wall engaging the underside of said arm when said yoke is raised.

4. A record player according to claim 3 in which said upstanding wall comprises a lower cut-out portion at one of said ends for receiving and trapping said arm when said arm is in its radially outermost position relative said record.

5. A record player according to any preceding claim in which said operating lever further comprises a second projection and said playing arm additionally has a lug engaged by said second projection as said lever arm is moved from its operating position to its non-operating position to move said arm to its radially outer position.

6. A record player according to claim 1 in which said base includes a sector-shaped opening through which said playing head extends into engagement with the sound groove of the record during operation, said head being raised clear of said sector-shaped opening when said lever is moved to its operating position.

7. A record player according to claim 1 in which said base has a leading edge in the sense of the direction of travel of said base as it sweeps around the record, said operating lever being mounted adjacent said leading edge and having one portion radially inwardly of its point of pivoting to the base and another portion radially outwardly, depression of the radially inward portion moving said lever to its non-operative position and depression of the radially outward portion relative said base moving said lever to its operative position.

* * * * *

UNITED STATES PATENT OFFICE
CERTIFICATE OF CORRECTION

Patent No. 4,498,164     Dated Feb. 5, 1985

Inventor(s) STEVEN A. LEBENSFELD

It is certified that error appears in the above-identified patent and that said Letters Patent are hereby corrected as shown below:

Column 2, line 2: "lift-up" should read --lifting--;
Column 6, line 2: "lift-up" should read --lifting--.

Signed and Sealed this

First Day of October 1985

[SEAL]

Attest:

Attesting Officer

DONALD J. QUIGG

Commissioner of Patents and Trademarks—Designate